United States Patent
Witton et al.

(10) Patent No.: US 6,616,096 B1
(45) Date of Patent: Sep. 9, 2003

(54) FAILSAFE ARRANGEMENT

(75) Inventors: Roger Witton, Wolverhampton (GB); Peter Ian Murray, Wolverhampton (GB)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 09/595,412

(22) Filed: Jun. 16, 2000

(30) Foreign Application Priority Data

Jun. 17, 1999 (GB) .............................................. 9914006

(51) Int. Cl.[7] .............................................. B64C 13/34
(52) U.S. Cl. ........................ 244/75 R; 188/134; 192/38
(58) Field of Search ............................... 244/75 R, 213; 188/134; 192/38, 44; 74/625

(56) References Cited

U.S. PATENT DOCUMENTS

| | | | | |
|---|---|---|---|---|
| 2,500,691 A | * | 3/1950 | Lear ........................ | 244/75 R |
| 3,203,275 A | * | 8/1965 | Hoover ........................ | 74/665 |
| 3,640,092 A | | 2/1972 | Neal et al. | |
| 3,701,401 A | * | 10/1972 | Palma et al. ................. | 188/134 |
| 3,802,281 A | * | 4/1974 | Clarke ........................ | 192/7 |
| 4,121,795 A | | 10/1978 | Craven | |
| 4,578,993 A | | 4/1986 | Burandt | |
| 4,688,744 A | * | 8/1987 | Aldrich ..................... | 244/75 R |
| 4,691,582 A | * | 9/1987 | Weyer ........................ | 74/409 |
| 4,742,730 A | * | 5/1988 | Dorn et al. ................... | 74/674 |
| 4,901,831 A | | 2/1990 | Ito et al. | |
| 5,016,740 A | | 5/1991 | Ito et al. | |
| 5,704,870 A | * | 1/1998 | Shephard ..................... | 475/342 |

* cited by examiner

*Primary Examiner*—Galen L. Barefoot
(74) *Attorney, Agent, or Firm*—Cantor Colburn LLP

(57) ABSTRACT

A failsafe arrangement comprising a first mounting member and a second mounting member which is angularly moveable relative to the first mounting member. The first and second mounting members define first and second surfaces respectively which define therebetween a channel, the first and second surfaces being shaped such that the channel is of non-uniform width. At least one wedge member is disposed within the channel, the or each wedge member being carried by a drive member and being arranged such that, in use, when the drive member and the second mounting member move at substantially the same angular speed, the wedge member does not impair movement of the second mounting member relative to the first mounting member, relative angular movement of the drive member and the second mounting member causing the wedge member to cooperate with the first and second surfaces to apply a braking force so as to impede relative angular movement of the first and second mounting members. In use, the first mounting member may be secured to an aircraft wing and the second mounting member may be secured to an aircraft wing flap.

11 Claims, 1 Drawing Sheet

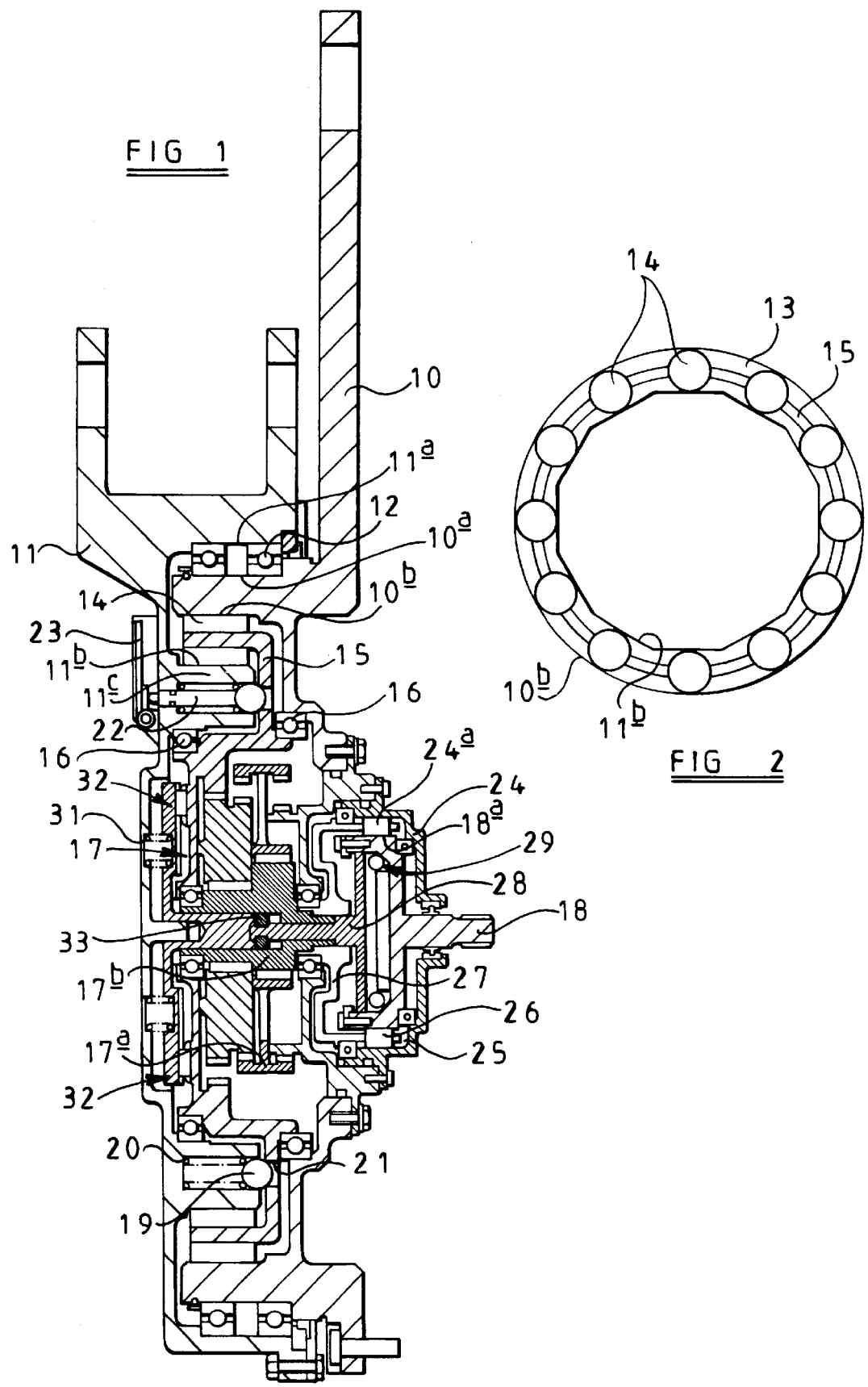

FAILSAFE ARRANGEMENT

TECHNICAL FIELD

This invention relates to a failsafe arrangement intended for use with an actuator, for example a rotary actuator used to drive aircraft flaps between, for example, raised and lowered positions. The failsafe arrangement is also suitable for use with actuators for use in other applications.

BACKGROUND OF THE INVENTION

Where a rotary actuator is used to drive a flap of an aircraft, it is important to be able to ensure that the movement of a drive shaft used to drive the rotary actuator results in corresponding movement of the flap in order to ensure that the flap is moved to and held in a desired position, in use. In the event of failure of the actuator such that rotary motion of the drive shaft is no longer transmitted to the flap, it is desirable to lock the flap against further movement. The drive shaft is conveniently also locked in position and a signal indicating that a failure has occurred is preferably generated.

U.S. Pat. No. 4,578,993 discloses an actuator including a plurality of gear arrangements driven by a common drive shaft. A ramp/ball arrangement is provided between the outputs of the gear arrangements. In the event of one of the gear arrangements failing, the ramp/ball arrangement operates to lock the outputs of the gear arrangements together. As a result, the actuator may become jammed against further movement and a signal indicative of the failure may be generated.

SUMMARY OF THE INVENTION

According to the present invention there is provided a failsafe arrangement comprising a first mounting member, a second mounting member angularly moveable relative to the first mounting member, the first and second mounting members defining first and second surfaces, respectively, which define therebetween a channel, the first and second surfaces being shaped such that the channel is of non-uniform width, at least one wedge member disposed within the channel and carried by a drive member, the wedge member being arranged such that when the drive member and the second mounting member move at the same angular speed, the wedge member does not impair movement of the second mounting member relative to the first mounting member, relative angular movement of the drive member and the second mounting member causing the wedge member to cooperate with the first and second surfaces to apply a braking force, impeding relative angular movement of the first and second mounting members.

Where such an arrangement is used with the actuator for an aircraft flap, the first mounting member is conveniently secured to the aircraft wing, the second mounting member being secured to the flap. The drive member is driven to move at the same rate as the flap in normal use. In the event of the failure of the actuator for the flap, the flap will cease movement whilst the drive member continues to move resulting in the wedge member moving to impede relative movement of the flap and the wing, locking the flap in position.

The first surface is conveniently of circular cross-section, the second surface being of polygonal form. The or each wedge member conveniently comprises a roller. Where the second surface is located radially inward of the first surface, the drive member is conveniently arranged to hold the rollers away from the apices of the second surface during normal operation, movement of the rollers towards the apices of the second surface occurring when relative movement occurs between the drive member and the second mounting member resulting in relative movement of the first and second mounting members being impeded.

The drive member is preferably driven by a drive shaft, an additional wedge member being associated with the drive shaft and arranged to impede rotation of the drive shaft relative to the first mounting member upon failure as described hereinbefore.

The provision of the additional wedge member reduces the risk of the failsafe becoming overloaded.

An indicator is conveniently provided, the indicator being arranged to provide a signal indicative of relative movement having occurred between the drive member and the second mounting member. The indicator may comprise a member carried by the second mounting member and received, at least in part, within a recess provided in the drive member, relative movement of the drive member and second mounting member causing the indicator member to ride out of the recess. The movement of the indicator member may be transmitted to an indicator flag, the movement of the flag away from a rest position providing a visual signal of the presence of a fault condition.

BRIEF DESCRIPTION OF THE DRAWINGS

The invention will further be described, by way of example, with reference to the accompanying drawings, in which:

FIG. 1 is a diagrammatic sectional view of a failsafe arrangement in accordance with an embodiment of the invention; and FIG. 2 is a diagrammatic view illustrating operation of the embodiment of FIG. 1.

DETAILED DESCRIPTION OF THE PREFERRED EMBODIMENT

The failsafe arrangement illustrated in the accompanying drawings is intended for use in monitoring the operation of a rotary actuator for use with a flap of an aircraft. The rotary actuator is driven by a drive shaft by a suitable motor, rotation of the drive shaft causing the flap to pivot about an axis. The speed of pivoting movement of the flap relative to the speed of rotation of the drive shaft is governed by a gearing arrangement contained within the actuator.

The failsafe arrangement comprises a first mounting member 10 which is arranged to be secured to a fixed part of the aircraft and a second mounting member 11 which is angularly movable relative to the first mounting member and is intended to be secured, in use, to the flap. The first and second mounting members 10, 11 are each provided with cylindrical walls 10a, 11a which are presented towards one another and between which bearings 12 are provided to guide the second mounting member 11 for pivotal movement relative to the first mounting member 10.

The first mounting member 10 is provided with a second, inwardly directed cylindrical surface 10b of substantially circular cross-section which encircles a polygonal surface 11b provided on an inwardly extending annular wall 11c of the second mounting member 11. The second surface 10b and polygonal surface 11b define, therebetween, a channel 13 which, as illustrated most clearly in FIG. 2, is of non-uniform width. A plurality of wedge members, which conveniently take the form of rollers 14, are located within the channel 13. The diameters of the rollers 14 are substantially equal to the maximum width of the channel 13, and as illustrated in FIG. 2, the rollers 14 being located such that each roller lies approximately midway along each flat side of the polygonal surface 11b.

The rollers 14 are carried by a drive member 15 which is rotatable within a housing defined by the first and second mounting members 10, 11, the drive member 15 being supported for rotational movement relative to both the first and second mounting members 10, 11 by means of bearings 16. The drive member 15 is arranged to be driven for rotation within the housing defined by the first and second mounting members 10, 11 by an eccentric gear arrangement 17 including a plurality of gears 17a, the gear arrangement 17 being arranged to be driven, in use, by an input shaft 18 which is driven by the drive shaft used to drive the actuator. The eccentric gear arrangement 17 is arranged to drive the drive member 15 such that angular movement of the drive member 15 occurs at the same speed as movement of the second mounting member 11 by the flap, for a given speed of rotation of the drive shaft.

As illustrated in FIG. 1, the wall 11c is provided with a plurality of drillings within which additional wedge members, in the form of spherical members 19, are located, springs 20 being provided to bias the spherical members 19 into engagement with the drive member 15. The drive member 15 is provided with recesses or relatively small diameter drillings 21, the members 19 being biased into engagement with the drillings 21 by means of the springs 20. It will be appreciated, therefore, that the drive member 15 is lightly held against movement relative to the second mounting member 11.

A pin 22 is provided in one of the drillings and is arranged to engage the associated member 19, the pin 22 being engageable with a pivotally mounted indicator flag or member 23 such that inward movement of the member 19, as would occur in the event that relative movement occurs between the drive member 15 and the second mounting member 11 forcing the member 19 out of the drilling 21, causes the pin 22 to push the indicator member 23 from a rest position to an actuated position. The indicator member 23 provides a visual indication of the presence of a condition in which relative movement of the drive member 15 and second mounting member 11 has occurred.

The input shaft 18 is provided with a surface 18a of polygonal form which is presented towards a cylindrical surface 24a of a housing part 24 which is secured to the first mounting member 10. The surfaces 18a, 24a define therebetween a channel 25 of non-uniform width within which rollers 26 are located. The rollers 26 are held in positions substantially midway along respective sides of the polygonal surface 18a by a second drive member 27 which, in normal use, is driven at substantially the same speed as the input shaft 18. This is achieved by mounting the second drive member 27 upon an input part 17b of the eccentric gear arrangement 17 through a splined coupling. The input part 17b of the eccentric gear arrangement 17 upon which the second drive member 27 is mounted is driven by the input shaft 18 through a ball/ramp drive arrangement 29 which comprises a plurality of balls or rollers located within recesses formed in the input shaft 18 and in a member 28 which is splined to the input part 17b. The splined coupling between the member 28 and the input part 17b allows limited axial movement of the member 28 to occur, the member 28 being moveable between a position in which the balls or rollers of the drive arrangement 29 are located within their respective recesses to transmit rotary movement of the input shaft 18 to the member 28, and a position in which the balls or rollers can ride out of the recesses so that drive is no longer transmitted to the member 28.

A plate 30 is located between the second mounting member 11 and the first drive member 15, the plate 30 being biased towards the first drive member 15 by springs 31 and being arranged to rotate with the second mounting member 11. A roller/ramp arrangement 32 is provided between the plate 30 and the first drive member 15 such that, in the event of relative angular movement occurring between the first drive member 15 and the plate 30, as occurs in the event of angular movement occurring between the first drive member 15 and the second mounting member 11, axial movement of the plate 30 occurs. A coupling arrangement 33 which permits angular movement to occur between the plate 30 and the member 28 is provided to transmit such axial movement to the member 28.

As mentioned briefly hereinbefore, the rollers 14 and the rollers 26 are positioned by the first and second drive members 15, 27 such that the rollers 14, 26 lie generally midway along each side surface of the respective polygonal surface 11b, 18a. In these positions, the rollers do not inhibit relative rotation of the surfaces 10b, 11b or relative rotation between the surfaces 18a, 24a . However, it will be appreciated that in the event that the first and second drive members 15, 27 move relative to the polygonal surfaces 11b, 18a to move the rollers 14, 26 away from the midway positions, then the rollers 14, 26 will act as wedges, preventing or impeding relative movement between the surfaces 10a, 11b and between the surfaces 18a, 24a.

In use, when the actuator with which the failsafe arrangement is associated is operating correctly, then rotation of the drive shaft causes pivoting movement of the flap. The movement of the flap causes movement of the second mounting member 11 as the second mounting member 11 is secured thereto. A limited amount of relative movement between the flap and the second mounting member 11 may be permitted, if desired. The rotation of the drive shaft which causes the movement of the flap will also cause rotation of the input shaft 18. The rotation of the input shaft 18 causes angular movement of the first drive member 15 at the same speed as the second mounting member 11 and the flap are moved due to the eccentric gear arrangement 17. Provided the actuator is operating correctly, as the first drive member 15 moves angularly at the same speed as the flap, and hence at the same speed as the second mounting member 11, both the first drive member 15 and the associated rollers 14 and the second mounting member 11 will move angularly relative to the first mounting member 10. The rollers 14 are held in the positions illustrated in FIG. 2 relative to the second surface 11b, occupying their substantially midway positions along the side surfaces forming the second surface 11b. Thus, relative angular movement of the first and second mounting members 10, 11 is not impeded. Similarly, the second drive member 27 will hold the rollers 26 in the midway positions along the sides defining the surface 18a and rotation of the input shaft 18 relative to the housing 24 and first mounting member 10 will not be impeded.

In the event that the actuator fails, then continued rotation of the drive shaft will not result in movement of the flap. As the flap is not moving, the second mounting member 11 will no longer move. However, if the drive shaft continues to rotate, then the rotary motion of the drive shaft will cause angular movement of the first drive member 15. This movement causes the rollers 14 to move along the side walls defining the second surface 11b into parts of the channel 13 of reduced width, and a point will be reached beyond which the rollers 14 serve to wedge the second mounting member 11, preventing or impeding relative movement between the first and second mounting members 10, 11. Once such wedging has occurred, the second mounting member 11 is held against angular movement relative to the first mounting member 10, thus the flap is secured against undesirable angular movement.

It will be appreciated that once the rollers 14 have moved into a wedging position, the first drive member 15 will no longer move, and this would apply an undesirable braking force through the gear arrangement 17 to the input shaft. The failsafe arrangement of this embodiment employs an alternative technique for preventing rotation of the drive shaft as follows. Upon relative rotation occurring between the first drive member 15 and the second mounting member 11, and hence the plate 30, the roller and ramp arrangements 32 cause the plate 30 to move axially against the springs 31. This movement is transmitted through the coupling arrangement 33 to the member 28, moving the member 28 to a position in which the drive arrangement 29 disengages, relative angular movement then being permitted between the input shaft 18 and the member 28. As the second drive member 27 is coupled to the member 28 through the input part 17b, it will be appreciated that relative angular movement is permitted between the second drive member 27 and the input shaft 18, and continued rotation of the input shaft 18 will cause the surface 18a to move towards a position in which the rollers 26 carried by the second drive member 27 are no longer located midway along the side surfaces defining the surface 18a, but rather in which the rollers 26 occupy a part of the channel 25 of reduced width, the rollers 26 serving to wedge the input shaft 18 against further movement.

It will be appreciated that in such circumstances, both the flap and the input shaft are wedged against further movement. Additionally, upon the relative movement having occurred between the first drive member 15 and the second mounting member 11, the members 19 ride out of the recesses 21, causing movement of the pin 22 to push the indicator member 23 from its rest position to its deployed position, thus providing a visual indication of the presence of any faults.

Although in the description hereinbefore, the second drive member 27 and rollers 26 are provided, thereby reducing the risk of the eccentric gear arrangement 17 and first drive member 15 and associated rollers 14 becoming overloaded, it will be appreciated that the provision of these integers is not essential to the invention.

What is claimed is:

1. A failsafe arrangement comprising a non-rotatable first mounting member, a second mounting member angularly moveable relative to the first mounting member, the first and second mounting member defining first and second surfaces respectively, which define therebetween a channel, the first and second surfaces being shaped such that the channel is of non-uniform width and at least one wedge member disposed within the channel and carried by a drive member, the wedge member being arranged such that, in use, when the drive member and the second mounting member move at substantially the same angular speed relative to the first mounting member, the wedge member does not impair movement of the second mounting member relative to the first mounting member, relative angular movement between the drive member and the second mounting member causing the wedge member to cooperate with the first and second surfaces to apply a braking force so as to impede angular movement of the second member and the drive member relative to the first mounting member.

2. The failsafe arrangement as claimed in claim 1, wherein the first mounting member is arranged to be secured, in use, to an aircraft wing and the second mounting member is arranged to be secured, in use, to an aircraft wing flap.

3. The failsafe arrangement as claimed in claim 1, wherein the first surface is of substantially circular cross-section and wherein the second surface is of polygonal form.

4. The failsafe arrangement as claimed in claim 1, wherein the second surface is located radially inward of the first surface.

5. The failsafe arrangement as claimed in claim 1, wherein the or each wedge member comprises a roller.

6. The failsafe arrangement as claimed in claim 5, wherein the drive member is arranged to hold the or each roller away from the apices of the second surface during normal operation, movement of the or each roller towards the apices of the second surface occurring when relative movement occurs between the drive member and the second mounting member to cause relative movement of the first and second mounting members to be impeded.

7. The failsafe arrangement as claimed in claim 1, wherein the drive member is driven, in use, by a drive shaft, the failsafe arrangement further comprising an additional wedge member associated with the drive shaft and arranged to impede rotation of the drive shaft relative to the first mounting member when relative movement occurs between the drive member and the second mounting member to cause relative movement of the first and second mounting members to be impeded.

8. The failsafe arrangement as claimed in claim 7, comprising a spring which serves to urge the additional wedge member into engagement with the drive member.

9. The failsafe arrangement as claimed in claim 1, comprising an indicator arrangement which is arranged to provide a signal indicative of relative movement having occurred between the drive member and the second mounting member.

10. The failsafe arrangement as claimed in claim 9, wherein the indicator arrangement comprises an indicator member carried by the second mounting member and received, at least in part, within a recess provided in the drive member, relative movement of the drive member and second mounting member causing the indicator member to ride out of the recess.

11. The failsafe arrangement as claimed in claim 10, comprising an indicator flag arranged such that movement of the indicator member, in the event of relative movement of the drive member and second mounting member, is transmitted to the indicator flag, movement of the indicator flag away from a rest position providing a visual signal of the presence of a fault condition.

* * * * *